July 8, 1924.  1,500,225
G. D. BORNSCHEIN
WRECKING TRUCK AND TOWING APPARATUS
Filed March 27, 1923   2 Sheets-Sheet 2
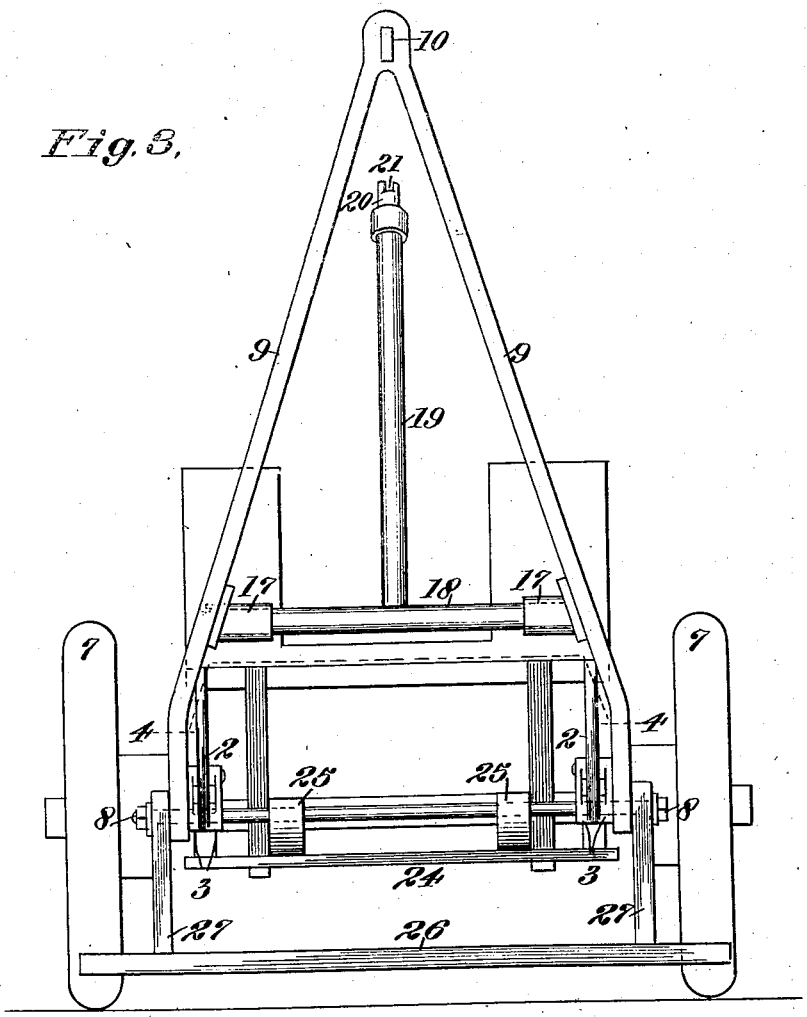
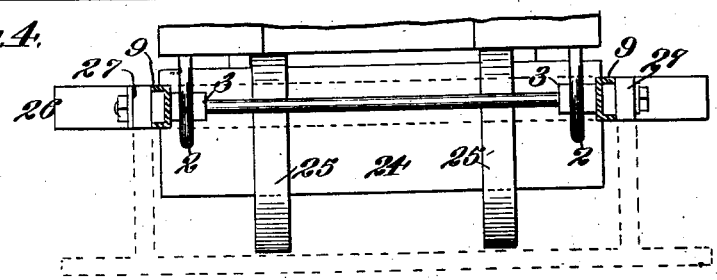
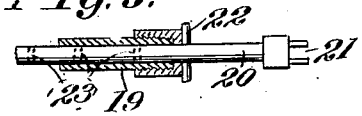

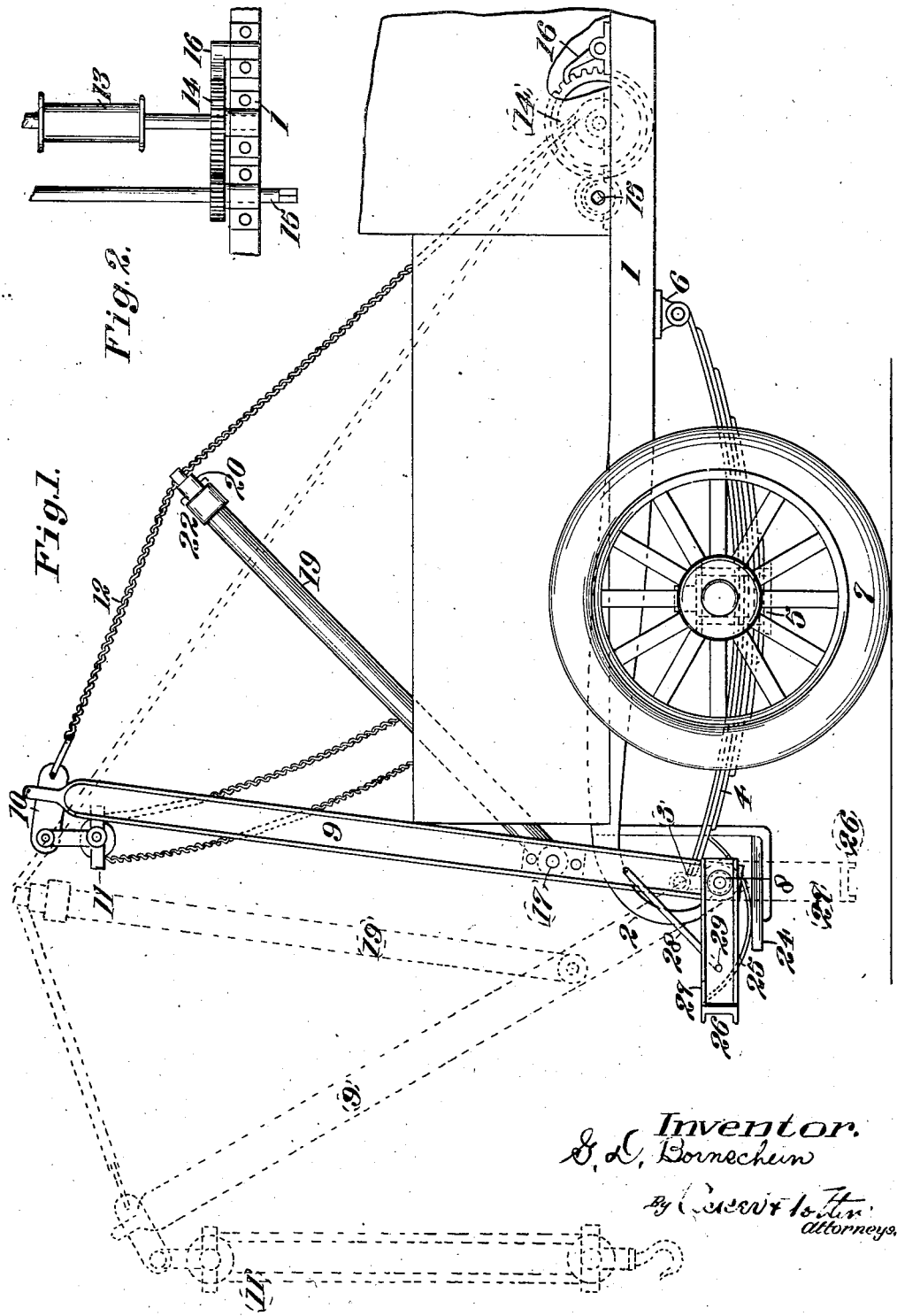

Patented July 8, 1924.

1,500,225

UNITED STATES PATENT OFFICE.

GEORGE D. BORNSCHEIN, OF SAN FRANCISCO, CALIFORNIA.

WRECKING TRUCK AND TOWING APPARATUS.

Application filed March 27, 1923. Serial No. 627,968.

*To all whom it may concern:*

Be it known that I, GEORGE D. BORNSCHEIN, a citizen of the United States, residing at the city and county of San Francisco and State of California, have invented certain new and useful Improvements in Wrecking Trucks and Towing Apparatus, of which the following is a specification.

The present invention relates to a self propelled wrecking truck and towing device provided with a type of elevating device adjustably positioned to afford the requisite leverage needed for elevating the wrecked vehicle, and which may be suitably braced by means contacting with the ground to support the load on the vehicle structure when the same exceeds a predetermined degree.

A further object is to provide a type of means movable into a plurality of positions, and in one position affording a guard or buffer disposed in rear of the vehicle to protect the same from injury due to an over-running of the towed vehicle, and in another position affording a ground engaging support. A further object is to provide a pivoted boom having associated therewith a flexible elevating member operated by a windlass mechanism and with which flexible member is associated an extensible strut pivotally supported to extend at any desired angle between the boom and windlass.

With the above mentioned and other objects in view, the invention consists in the novel construction and combinations of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein—

Fig. 1 is a view in side elevation of the rear end of a self propelled vehicle illustrating the preferred embodiment of my invention mounted thereon.

Fig. 2 is a fragmentary detail plan view of the elevating windlass.

Fig. 3 is a view in rear elevation of the preferred embodiment of my invention, the flexible connection being removed to afford a clear illustration of the construction and illustrating the guard in vertical position.

Fig. 4 is a sectional view taken on line 4—4 of Fig. 3, illustrating the position of the buffer in dotted lines when the same extends rearwardly of the vehicle.

Fig. 5 is a fragmentary sectional view of the extensible end of the strut.

Referring more particularly to the drawings, wherein like characters of reference designate corresponding parts—1 indicates a vehicle frame, the rear ends of which are rearwardly and downwardly curved as at 2 to provide supporting horns. The ends of the horns are connected through shackles 3 with the rear ends of the conventional frame supporting springs 4 attached to the rear axle housing 5. The forward ends of the springs are secured to the frame 1 through members 6. Wheels 7 support the rear of the vehicle frame and in this particular illustration, the drive mechanism for the vehicle has been eliminated.

Fulcrumed to the connection 8 between the lower ends of the shackles 3 and their point of connection with the horns 2 are the lower ends of the A-frame which provides a boom 9. The upper end of the A-frame mounts a head 10 to the outer end of which is adapted to be connected a suitable type of hoisting gear 11 of the well known form, it being illustrated in dotted lines in Fig. 1 in the form of a block and tackle construction.

To the end of the head 10 is connected the end of a flexible operating chain or member 12 utilized for raising and lowering the boom 9. The end of the chain or connection 12 is adapted to wind about the drum 13 of a conventional form of windlass 14 carried by the frame 1. The drum is operated in the present illustration by a crank, not shown, which fits over the end of the squared shaft 15, and a pawl 16 is adapted to retain the drum 13 in any desired position.

Illustrated as pivotally mounted in the tubular sleeves 17, carried on the opposite inner faces of the side members of the A-frame, are the opposite ends of the cross head 18, from which extends the main tubular member 19, forming a strut.

Adjustably receivable within the outer end of the member 19 of the strut is an extensible strut member 20 having a slotted recess 21 at its outer end and said member 20 is adapted to be retained in its adjusted position by a retaining pin 22 insertable into registering openings 23 formed throughout the length of the member 20. The slotted end of the member 20 is adapted to receive the flexible connection 12 and said strut is adapted for pivotal movement to enable a variation of leverage to be exerted on the end of the boom 9 dependent on the load desired to be lifted and the angular position of the boom 9 rearwardly of the vehicle.

At the rear of the frame there is provided a suitable step or support 24 disposed transversely of the frame, and the same carries cradles 25 for receiving the wheels of a conventional form of dolly, not illustrated.

To prevent the step and rear portion of the vehicle from being injured by an overrunning of the vehicle being towed, I provide a suitable buffer at the rear of the vehicle, and the same in the present embodiment comprises an impact receiving member 26 disposed transversely of the vehicle frame 1, and from said member extends the supporting arms 27 fulcrumed at their inner ends to the member 8.

The buffer is adapted for swinging movement downwardly from its full line position—Fig. 1, to its full line position—Fig. 3, in which latter position it affords a supporting member to rest on the ground and take up the load placed on the springs 4.

The buffer is retained in its horizontal position in Fig. 1 by suitable hooks 28 fulcrumed to the side members of the A-frame. The ends of the hooks are adapted for reception within apertures 29 in the supporting arms 27, as clearly illustrated in Fig. 1.

It will be observed that the buffer is capable of two functions—one of protecting the end of the apparatus from being over-run and damaged by the vehicle being towed, and also of affording a means for carrying the load placed on the springs when the springs are deflected or placed under a severe strain. The extensibility and fulcruming of the strut to engage the flexible connection 12 between the windlass and its point of attachment to the head enables greater or less leverage being applied to the boom, as will be clearly understood.

I claim:

1. In combination with a vehicle, a boom carried at the rear end thereof, and a guard carried by the frame and associated with the rear end of the vehicle to normally project rearwardly therefrom, said guard adapted for movement to provide a frame rest to support the load carried by the boom.

2. In combination with a vehicle, a boom carried at the rear end thereof and a guard extending transversely of and pivotally mounted to the rear of the vehicle frame to swing on a horizontal axis, said guard being movable on its pivot into a plurality of positions, in one position providing a frame rest to support the load carried by the boom and in another position providing a buffer disposed transversely of the rear of the vehicle.

3. In combination with a vehicle, a boom pivotally mounted thereon to swing on a horizontal axis to overhang the rear of the vehicle, an extensible strut pivotally mounted to swing on a horizontal axis to overlie the vehicle, a flexible operating connection associated with the boom and extending over and engaged by the strut and a guard extending transversely across the rear of the vehicle and capable of pivoting on a horizontal axis into a vertical position to lie beneath the vehicle to support the load carried by the boom.

4. In combination with a vehicle frame, a boom fulcrumed thereon to swing on a horizontal axis to overhang the rear of the frame, a flexible operating connection attached to the boom, a take-up device for said connection associated with the frame and adapted for operation for raising and lowering the boom, a strut fulcrumed to swing free of the boom on a horizontal axis and adapted for engaging the flexible connection intermediate of its connection with the boom and the take-up device, and means depending from the frame for contacting with a support independently of the vehicle structure whereby on a slight load being placed on the boom the supporting strain therefor is transferred to a point other than the vehicle structure.

In testimony whereof I have signed my name to this specification.

GEORGE D. BORNSCHEIN.